United States Patent [19]

Burg

[11] Patent Number: 5,688,020
[45] Date of Patent: Nov. 18, 1997

[54] TAILGATE MOUNTED DRAG REDUCING AEROSTABILIZER

[76] Inventor: Donald E. Burg, 15840 SW. 84 Ave., Miami, Fla. 33157

[21] Appl. No.: 638,977

[22] Filed: Apr. 25, 1996

Related U.S. Application Data

[63] Continuation-in-part of Ser. No. 338,255, Nov. 14, 1994, abandoned, and a continuation-in-part of Ser. No. 342,843, Nov. 21, 1994, abandoned, and a continuation-in-part of Ser. No. 584,390, Jan. 8, 1996, abandoned, and a continuation-in-part of Ser. No. 589,351, Jan. 22, 1996, abandoned.

[51] Int. Cl.$^6$ ................................... B62D 35/00
[52] U.S. Cl. ................. 296/180.1; 296/57.1; 296/180.5
[58] Field of Search ................. 296/180.1, 180.2, 296/180.5, 51, 57.1; 188/270

[56] References Cited

U.S. PATENT DOCUMENTS

| | | | |
|---|---|---|---|
| 4,585,263 | 4/1986 | Hesner | 296/180.1 |
| 4,863,213 | 9/1989 | Deaver et al. | 296/57.1 |
| 4,884,838 | 12/1989 | Slater | 296/57.1 |
| 5,199,762 | 4/1993 | Scheele et al. | 296/180.1 |
| 5,232,260 | 8/1993 | Lippard | 296/51 |
| 5,236,242 | 8/1993 | Seeman | 296/57.1 |
| 5,320,397 | 6/1994 | Peterson et al. | 296/180.1 |

FOREIGN PATENT DOCUMENTS 2912-612  10/1980  Germany .................... 296/180.1

OTHER PUBLICATIONS

Advertisement of "Street Effects" rear spoiler in Minitruckin magazine, Jan. 1993.

*Primary Examiner*—Dean Kramer
*Attorney, Agent, or Firm*—Robert J. Van Der Wall

[57] ABSTRACT

The pickup truck tailgate mounted drag reducing aerodynamic stabilizer or aerostabilizer acts as a turning vane(s) to direct air out over the tailgate thereby reducing drag, provides a stabilizing downward force on the aft end of the pickup truck during forward high speed operation of the pickup truck, and all of this is accomplished with an assembly that is out of the way when the tailgate is opened for carrying long boards or the like. The tailgate aerostabilizer is a very simple, low cost, and easy to install device that can, in its preferred embodiment, be molded from one piece from weather resisting plastics or the like. An optional feature is a built in air braking device that can have as forces for actuation, in addition to aerodynamic forces, a torque spring, powered actuator, or other artificial force generator.

25 Claims, 3 Drawing Sheets

TAILGATE MOUNTED DRAG REDUCING AEROSTABILIZER

CROSS REFERENCE TO OTHER APPLICATIONS

This application is a continuation-in-part to applicant's earlier application Ser. Nos. 338,255 filed Nov. 14, 1994 now abandoned; 342,843 filed Nov. 21, 1994 now abandoned; 584,390 filed Jan. 8, 1996 now abandoned; and 589,351 filed Jan. 22, 1996 now abandoned.

BACKGROUND OF THE INVENTION

The instant invention describes a tailgate mounted drag reducing aerodynamic stabilizer or aerostabilizer. The aerostabilizer is purposely mounted to the top of the tailgate which has a multiplicity of benefits. First, the aerostabilizer is mounted so that its forward portion is proximal to or preferably slightly aft of a forward portion of the tailgate. The benefit of this is that when the tailgate is opened or down the aerostabilizer is out of the way for hauling long boards or other large cargo where the tailgate must be opened. Compare this with the pickup truck rear spoiler that is permanently mounted in the stake pockets and therefore always in the way. An example of a pickup truck rear spoiler can be seen in the Street Effects advertisement from page 30 of the January 1993 issue of MINITRUCKIN magazine.

A second benefit of the instant invention over prior art is that the instant invention acts as a turning vane(s) to scavenge or direct air flow out over the tailgate with minimum drag or resistance. When operating at high speeds, a pickup truck's tailgate has quite a high drag air pressure front built up in front of it. There is also a high drag turbulence that occurs when the air pressure front encounters air flowing rearward above the tailgate. In the preferred embodiment of the instant invention the tailgate aerostabilizer is downwardly angled over its forward end to thereby aid air flow out from forward of the tailgate by acting as a high efficiency air turning vane. Use of a second, third, or even more vanes as aerostabilizers to create a bifoil or trifoil effect can further aid in reducing drag since they can also act as air flow turning vanes.

Yet a third benefit is that the tailgate aerostabilizer is that, in its preferred embodiment, it is capable of not only reducing tailgate drag but also of generating a downward force on the tailgate at high forward speeds. This is accomplished by having an aft portion of the instant inventive aerostabilizer higher than a forward portion thereby acting much in the same manner as a horizontal stabilizer on an airplane. The benefit of this downward force is that the pickup truck becomes more stable.

There are also other benefits and features of the instant invention tailgate aerostabilizer that are superior to prior art. These include a bracket mount system that makes the tailgate aerostabilizer quick and easy to install as a very low cost aftermarket product. The preferred embodiment of the mounting system is relatively flush and mounts to a forward top portion of the tailgate so that it is out of the way when the tailgate is open and extended length materials are being transported in the pickup's cargo bed. Deaver, et al., U.S. Pat. No. 4,863,213, describes an air deflector that mounts on the top of the tailgate of a pickup truck. Very importantly however, Deaver's invention does not have an air gap that acts as an air flow passageway to scavenge air pressure from the front side of the tailgate when the pickup truck is moving forward as does the instant invention. Therefore, Deaver's invention cannot have air flowing from in front of his tailgate and then under an aerodynamic spoiler as is a critical portion of the instant invention. Importantly, Deaver's invention is not am aerofoil or truly aerofoil shaped as only the upper portion of his concept is exposed to air flow. This is in notable contrast to the instant invention that presents an at least partially airfoil shaped aerostabilizer that is mounted above and distal, as separated by an air flow gap, from the tailgate.

Scheele et al. U.S. Pat. No. 5,199,762 offers a two part air deflector that is intended to deflect air downward behind a square-backed vehicle such as a school bus to thereby try to keep the rear windows in clean air. His design would have a drag increasing effect and, further, is not intended to mount to the tailgate of a pickup truck and reduce drag of the tailgate of such pickup truck as is a principal purpose of the instant invention. German patent 2912-612 presents an air current deflector for motor vehicles that has a guide face sloping upwards from front to rear and that mounts at the front of the vehicle with its leading edge extending transversely. This German patent has little resemblance to the instant invention since it does not have provision for reducing the air pressure on the front side of a pickup truck's tailgate and of placing a downward force on the back end of the pickup truck by mounting to and opening with the tailgate of a pickup truck as are primary purposes of the instant invention.

Hesner, U.S. Pat. Nos. 4,585,263, and Slater, 4,884,838, both offer ramps that extend from the cargo bed floor to the top of a pickup truck's tailgate in attempts to reduce drag by directing air flow up and over the tailgate. Neither Hesner nor Slater offer an aerostabilizer nor an air flow gap between such aerostabilizer and the top of the tailgate as does the instant invention so there is little resemblance between Hesner or Slater and the instant invention.

Peterson et al, U.S. Pat. No. 5,320,397, presents a multiple piece cargo bed cover system that folds up into a pickup truck's tailgate when not in use. Peterson et al does not offer an aerostabilizer nor an air flow gap between such aerostabilizer and the top of the tailgate as are important aspects of the instant invention. Lippard, U.S. Pat. No. 5,232,260, presents a tailgate design with two separate and distinct parts. The lower half opens and functions much like a standard tailgate while the upper half pivots around an upper portion of the cargo bed frame. These two members are not connected and the upper half does not open or move when the lower half is opened. Since there is no attachment between the two parts, the upper half of Lippard's tailgate assembly does not open with the lower half and is therefore always in the way for loading cargo and the like. As such, there is little resemblance between Lippard's invention and the instant invention.

An optional feature of the instant invention is an air braking ability that can be included as part of the invention. This air braking flap or vane can have its movement resiliently biased or powered by actuator(s).

SUMMARY OF THE INVENTION

With the foregoing in mind, it is the principal object of the present invention to offer a simple yet attractive and low cost tailgate mounted drag reducing aerodynamic stabilizer for pickup trucks.

It is a related object of the invention that tailgate drag reduction is accomplished by one or more vanes or aerostabilizers mounted, at least in their majority, above the tailgate.

Another related object of the invention is that the aerostabilizer(s) be at least in part airfoil shaped to improve efficiency and reduce drag.

It is a further related object of the invention that the aerostabilizer be attached to the tailgate so that it swings out of the way when the tailgate is opened.

Yet another related object of the invention is that a forward portion of the aerostabilizer be angled downward to improve its efficiency in scavenging air from the pressure front that builds up forward of the tailgate at high forward speeds.

It is a directly related object of the invention that the downward angle of a forward portion of the aerostabilizer be at least twenty degrees to horizontal.

A further related object of the invention is that there be a gap between the aerostabilizer and a upper portion of the tailgate so that air can flow out the underside of the tailgate aerostabilizer.

It is a directly related object of the invention that the just mentioned gap should be, on average, at least one half inch with at least one inch preferred.

It is yet another object of the invention that the tailgate aerostabilizer be capable of exerting a downward force on the tailgate of the pickup truck when the pickup truck is traveling forward at high speed.

Yet one more object of the invention is that a portion of the tailgate aerostabilizer be movable such that it can act as an aerodynamic brake during portions of pickup truck operation.

It is a directly related object of the invention that at least a portion of the force for operation of the aerodynamic brake be from a resilient force generating means.

A directly related object of the invention is that the resilient force generating means is a spring.

It is another object of the invention that at least part of the force required for movement of the aerodynamic brake can be provided by a powered actuator.

Another object of the invention is that a reflector or a light, most likely in the form of a brake light, can be incorporated as an integral part of the invention.

The invention will be better understood upon reference to the drawings and detailed description of the invention which follow in which:

DETAILED DESCRIPTION

Figure 1:
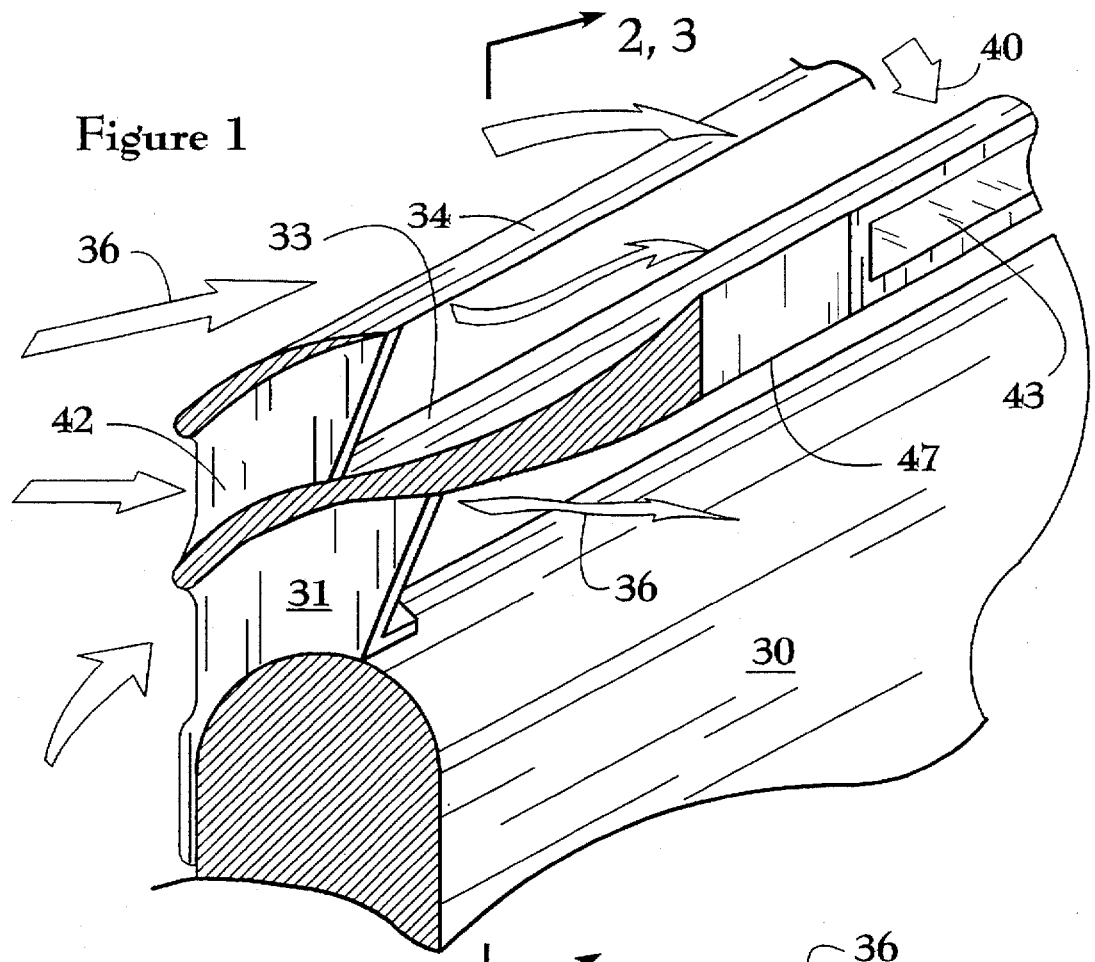
FIG. 1 presents a partial isometric view of the inventive aerostabilizer with two vanes as installed on top of a pickup truck tailgate. Note the smooth air flow patterns as shown by the air flow arrows. While two or more vanes are preferred, use of only one vane is acceptable.

FIG. 1 presents a partial isometric view of one version of the tailgate aerostabilizer assembly 47 as mounted to a pickup truck tailgate 30. In this case a first tailgate aerostabilizer 33 is attached to the tailgate 30 by first bracket 31 and a second tailgate aerostabilizer 34 is in turn attached to the first aerostabilizer 33 by second bracket 42. It is important to note that the use of brackets is made for illustration only and that the brackets can actually be an integral part of the aerostabilizers if desired.

Note the smooth low drag air flow patterns in this FIG. 1 example that is for high vehicle forward speeds as is illustrated by air flow arrows 36. The aerodynamic forces create a downward force on the aerostabilizer as is pointed out by aerodynamic force arrow 40. This force adds to pickup truck stability at high vehicle speeds. It is preferred that the aerostabilizers be, at least in part, airfoil shaped to enhance aerodynamic efficiencies. Further, it is a preferred embodiment of the instant invention that at least a majority of a width of a forward portion of the aerostabilizer be angled downward from horizontal by at least twenty degrees to improve air flow patterns exiting over the top of the tailgate. An optional reflector or light 43 is also shown.

Figure 2:
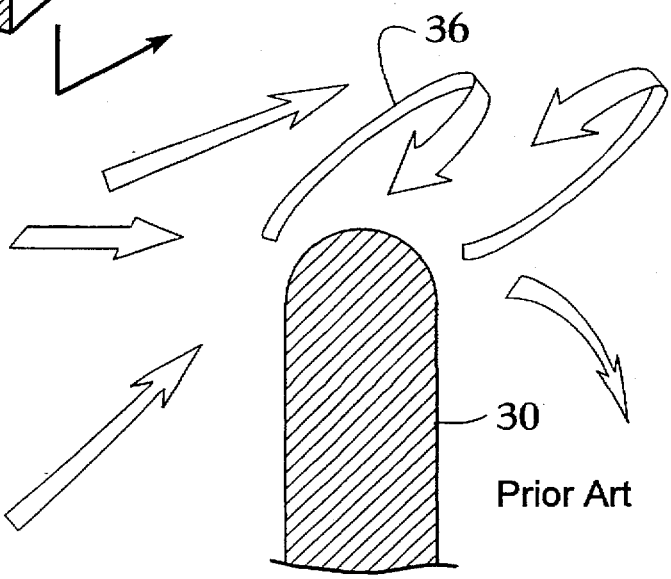
FIG. 2 shows a partial cross sectional view, as taken through a vertical longitudinal plane of a pickup truck, of a standard pickup truck tailgate when traveling forward at high speed. Note the high drag turbulent air flow patterns generated when the air in the pressure front built up in front of the tailgate encounters the air flowing over the tailgate.

FIG. 2 is a partial cross sectional view of the tailgate 30, as taken through line 2—2 of FIG. 1, but without the instant inventive tailgate aerostabilizer installed. Note the high drag turbulent air flow patterns as illustrated by air flow arrows 36.

Figure 3:
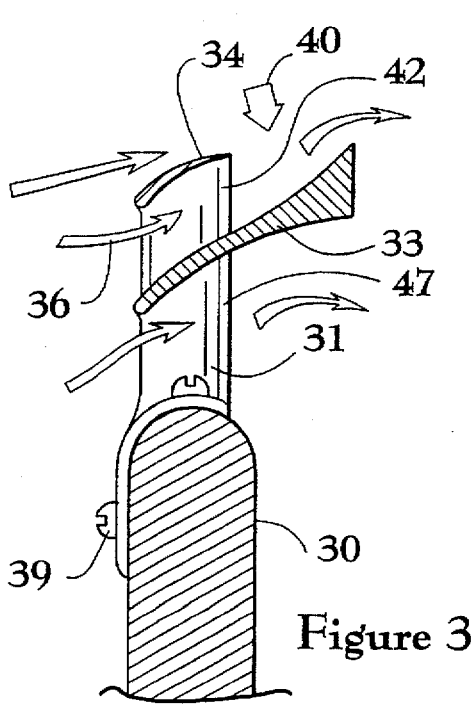
FIG. 3 is a partial cross sectional view, as taken through line 3—3 of FIG. 1, that shows the same tailgate as presented in FIG. 2 but with the inventive aerostabilizer installed. Note the even low drag air flow patterns as shown by the air flow arrows.

FIG. 3 presents a partial cross sectional view, as taken through line 3—3 of FIG. 1, that shows the tailgate 30 with the aerostabilizer installed. The preferred method of installation is as shown with simple low cost fasteners 39 used to mount first bracket 31 to the tailgate 30. The brackets can, of course, be made as integral parts of the aerostabilizer(s). It is a preferred embodiment of the instant invention that there be an air gap between the forward portion of the first aerostabilizer and the tailgate of at least one half inch with one inch or more even better for aiding air flow out over the tailgate.

Figure 4:
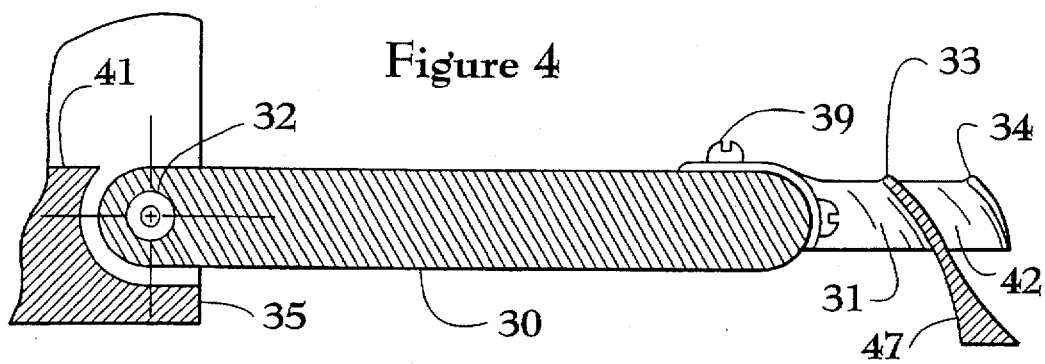
FIG. 4 is essentially the same cross sectional view as that presented in FIG. 3 but with the tailgate open for carrying long boards and/or large parcels. Note that the attachment means and aerodynamic vanes are nearly flush with the upper surface here to prevent damage when carrying long objects.

FIG. 4 is a partial cross sectional view with the tailgate open or horizontal as rotated about the tailgate's hinge 32. Items shown include the pickup truck's body 35 and cargo bed 41. The reason for this illustration is to show the relatively flat upper surface presented to cargo by the tailgate 30 and aerostabilizer assembly 47 when the tailgate 30 is open.

Figure 5:
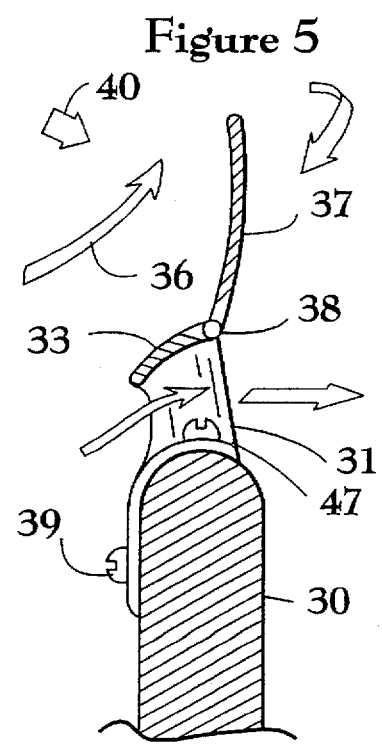
FIG. 5 is a partial cross sectional view of an optional version of the instant inventive tailgate aerostabilizer that has a movable vane portion that can act as an air spoiler which in this case is acting as an air brake. Note the force arrow showing action of the air forces on the tailgate and therefore the pickup truck.

FIG. 5 presents a partial cross sectional view of an alternative embodiment of the instant invention that has an aerobrake vane 37 that is movable in relation to the tailgate 30. In this instance it is rotatable about an aerobrake hinge 38. In this FIG. 5 the aerobrake vane 37 is at its maximum upward and therefore maximum braking position.

Figure 6:
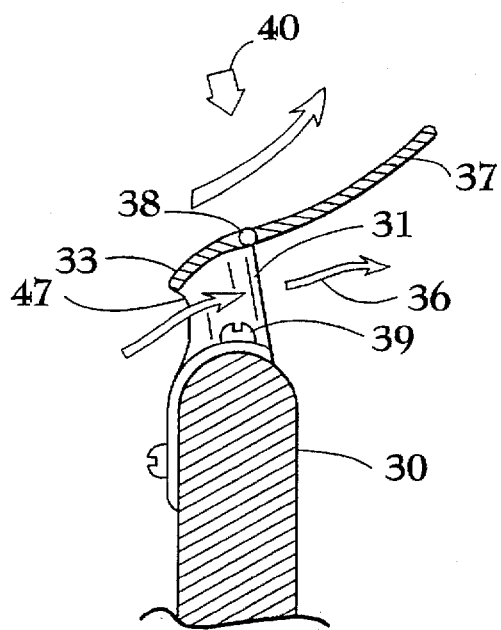
FIG. 6 is the same partial cross sectional view as presented in FIG. 5 but with the movable vane portion in mid-position.

FIG. 6 is the same view as presented in FIG. 5 but with the aerobrake vane 37 at a mid-position.

Figure 7:
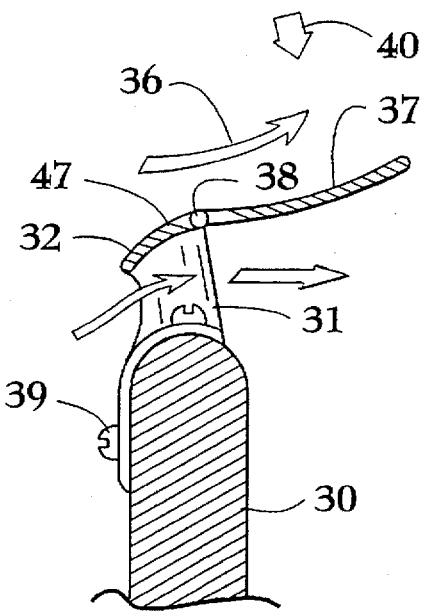
FIG. 7 shows the same partial cross sectional view as in FIGS. 5 and 6 but with the movable vane portion in its high speed lowest drag orientation.

FIG. 7 presents the same view as FIGS. 5 and 6 but with the aerobrake vane 37 at its lowest or most streamlined position which occurs at high speed forward movement of the pickup truck. Note the different orientation of the aerodynamic force arrows 40 in FIGS. 5, 6, and 7. It can be seen that FIG. 5 has the most braking force and FIG. 7 the most downward force.

Figure 8:
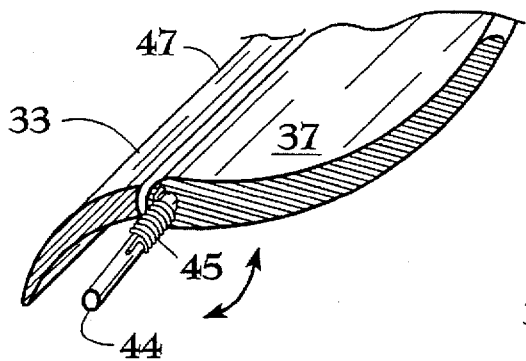
FIG. 8 is a partial cross sectional isometric view that shows one method of resiliently biasing the movable vane portion of FIGS. 5, 6, and 7. In this case resilient biasing forces are provided by means of a torque spring.

FIG. 8 is a partial cross sectional view of the aerostabilizer of FIG. 7 that shows use of an optional torque spring 45 to supply a resilient biasing force for movement of the aerobrake vane 37. Note that other means to supply a resilient biasing force including gas cylinders, compression or extension springs, and the like can be used.

Figure 9:
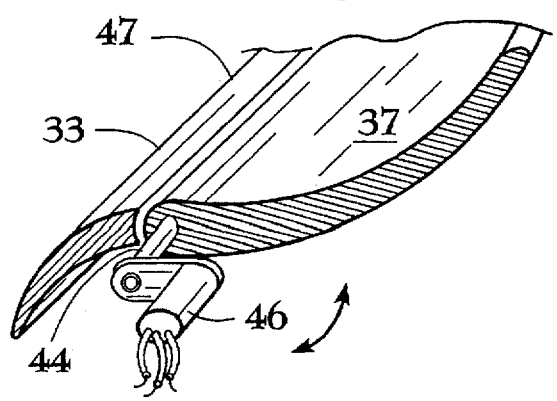
FIG. 9 is a partial cross sectional isometric view that shows a drive motor that is used in this instance for rotational power to move the movable vane portion. Note that any other actuation means including hydraulic or pneumatic cylinders and the like are also usable.

FIG. 9 is another partial cross sectional view of the aerostabilizer of FIG. 7. In this case a motorized actuator 46 is used to supply power for movement of the aerobrake vane 37. Note that any recognized means of supplying actuation power, including pneumatic or hydraulic actuators and the like, is acceptable.

While the invention has been described in connection with a preferred and several alternative embodiments, it will be understood that there is intended to be covered all alternatives, modifications and equivalents as may be included within the spirit and scope of the invention as defined by the appended claims, which are the sole definition of the invention.

What I claim is:

1. In an improved pickup truck including a cargo bed and an opening tailgate positioned proximal an aft end of said cargo bed, the improvement comprising:

a first aerostabilizer in mechanical communication with said tailgate such that said first aerostabilizer moves with the tailgate during opening and closing of said tailgate, said first aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap between at least a majority of a width of an underside of said first aerostabilizer and an upper portion of said tailgate, and whereby air from a forward portion of said tailgate, when said tailgate is closed in its vertical position and the pickup truck is moving forward, passes freely through said air gap thereby relieving air pressure from a forward portion of the tailgate.

2. The improved pickup truck of claim 1 wherein said air gap is at least one half inch.

3. The improved pickup truck of claim 1 wherein said air gap is at least one inch.

4. The improved pickup truck of claim 1 wherein said first aerostabilizer is attached to the tailgate by attachment means that attaches to a forward portion of the tailgate.

5. The improved pickup truck of claim 1 wherein said first aerostabilizer is, at least in part, curvilinear in shape.

6. The improved pickup truck of claim 1 wherein said first aerostabilizer is, at least in part, airfoil shaped.

7. The improved pickup truck of claim 1 wherein the forward portion of said first aerostabilizer is, at least over a majority of said first aerostabilizer's width and when the tailgate is in its vertical position, angled downward from horizontal to thereby act as a turning vane and direct air movement from the cargo bed out past the tailgate.

8. The improved pickup truck of claim 7 wherein the forward portion of said aerostabilizer is, at least over a majority of said aerostabilizer's width and when the tailgate is in its vertical position, angled downward from horizontal by at least twenty degrees.

9. The improved pickup truck of claim 1 which further comprises a second aerostabilizer in mechanical communication with the first aerostabilizer.

10. The improved pickup truck of claim 1 which further comprises a movable, in relation to the first aerostabilizer, airbrake vane that is also in mechanical communication with the first aerostabilizer.

11. The improved pickup truck of claim 10 wherein movement of the airbrake vane is resiliently biased.

12. The improved pickup truck of claim 10 wherein power for movement of the airbrake vane is at least partially supplied by an actuator.

13. The improved pickup truck of claim 1 wherein said first aerostabilizer further comprises a stoplight.

14. In an improved pickup truck including a cargo bed and an opening tailgate positioned proximal an aft end of said cargo bed, the improvement comprising:

a first aerostabilizer in mechanical communication with said tailgate by attachment means that attaches to the tailgate such that said first aerostabilizer moves with the tailgate during opening and closing of said tailgate, and a forward portion of said first aerostabilizer is, at least over a majority of said first aerostabilizer's width and when the tailgate is in its vertical position, angled downward from horizontal to thereby aid in directing air flow from the cargo bed out over the tailgate, wherein said first tailgate aerostabilizer is at least in part curvilinear, whereby there is an air gap between at least a majority of a width of an underside of said first aerostabilizer and an upper portion of said tailgate, as seen with the tailgate in its closed or vertical orientation, and whereby air from a forward portion of said tailgate, when said tailgate is closed in its vertical position and the pickup truck is moving forward, passes freely through said air gap thereby relieving air pressure from a forward portion of the tailgate.

15. The improved pickup truck of claim 14 wherein the forward portion of said first aerostabilizer is, at least over a majority of said first aerostabilizer's width and when the tailgate is in its vertical position, angled downward from horizontal by at least twenty degrees.

16. The improved pickup truck of claim 14 which further comprises one or more additional aerostabilizers positioned, at least in part and when the tailgate is in its vertical position, at a higher elevation than the first aerostabilizer.

17. The improved pickup truck of claim 14 wherein said first aerostabilizer further comprises a stoplight.

18. The improved pickup truck of claim 14 wherein said attachment means attaches to a forward portion of said tailgate.

19. In an improved pickup truck including a cargo bed and an opening tailgate positioned proximal an aft end of said cargo bed, the improvement comprising:

an aerostabilizer in mechanical communication with and positioned, at least in its majority, proximal to and above the tailgate such that said first aerostabilizer moves with the tailgate during opening and closing of the tailgate, a majority of said aerostabilizer's forward portions lower than a majority of its aft portions when the tailgate is in its vertical position, and a majority of a width of an underside of said aerostabilizer separated from the tailgate by an air gap, and whereby air from a forward portion of said tailgate, when said tailgate is closed in its vertical position and the pickup truck is moving forward, passes freely through said air gap thereby relieving air pressure from a forward portion of the tailgate.

20. The improved pickup truck of claim 19 wherein the air gap is at least one inch.

21. The improved pickup truck of claim 19 wherein said aerostabilizer is at least in part airfoil shaped.

22. The improved pickup truck of claim 19 wherein a majority of said aerostabilizer's forward portions are angled downward from horizontal by at least twenty degrees.

23. The improved pickup truck of claim 19 wherein said aerostabilizer is at least in part curvilinear.

24. The improved pickup truck of claim 19 wherein said first aerostabilizer further comprises a stoplight.

25. The improved pickup truck of claim 19 wherein said aerostabilizer is in mechanical communication with the tailgate by an attachment means that attaches to a forward portion of said tailgate.

\* \* \* \* \*